United States Patent vonBieren et al.

[19]

[11] Patent Number: 5,555,086
[45] Date of Patent: Sep. 10, 1996

[54] COHERENCE MULTIPLEXED INTERFEROMETRIC SIGNAL PROCESSING SYSTEM AND METHOD

[75] Inventors: Karlheinz vonBieren, Camarillo; Donald A. Frederick, Canoga Park, both of Calif.

[73] Assignee: Litton Systems, Inc., Woodland Hills, Calif.

[21] Appl. No.: 996,974

[22] Filed: Dec. 24, 1992

(Under 37 CFR 1.47)

Related U.S. Application Data

[63] Continuation-in-part of Ser. No. 707,877, May 31, 1991, abandoned.

[51] Int. Cl.$^6$ ........................................................ G01B 9/02
[52] U.S. Cl. ...................... 356/345; 356/351; 250/227.27
[58] Field of Search ..................................... 356/345, 351; 250/227.19, 227.27

[56] References Cited

U.S. PATENT DOCUMENTS 4,747,688 5/1988 Geary ........................................ 356/345
4,862,424 8/1989 Graebner et al. ........................ 356/345

*Primary Examiner*—Samuel A. Turner
*Attorney, Agent, or Firm*—Lynn & Lynn

[57] ABSTRACT

A fiber optic sensor system includes a plurality of interferometric sensors arranged in an array to monitor a selected parameter and means for providing two-mode optical signals to each of the interferometric sensors. The two modes have different propagation velocities so that each sensor produces an optical signal indicative of changes in the parameter. A return optical fiber receives signals output from each of the plurality of interferometric sensors. The optical signals in the return fiber are separated and input to a Fourier transform lens that forms a plurality of spatially separated fringe patterns on a grating. Each fringe pattern corresponds to the optical signal output from a selected sensor. A photodetector array monitors the fringe patterns simultaneously and continuously to detect changes in the parameter. A phase modulator modulates the phase of one of the optical sensor signals output from the sensor array. Changes in the parameter either shift the locations of the fringe patterns or produce and additional phase modulation in the fringe patterns.

28 Claims, 5 Drawing Sheets

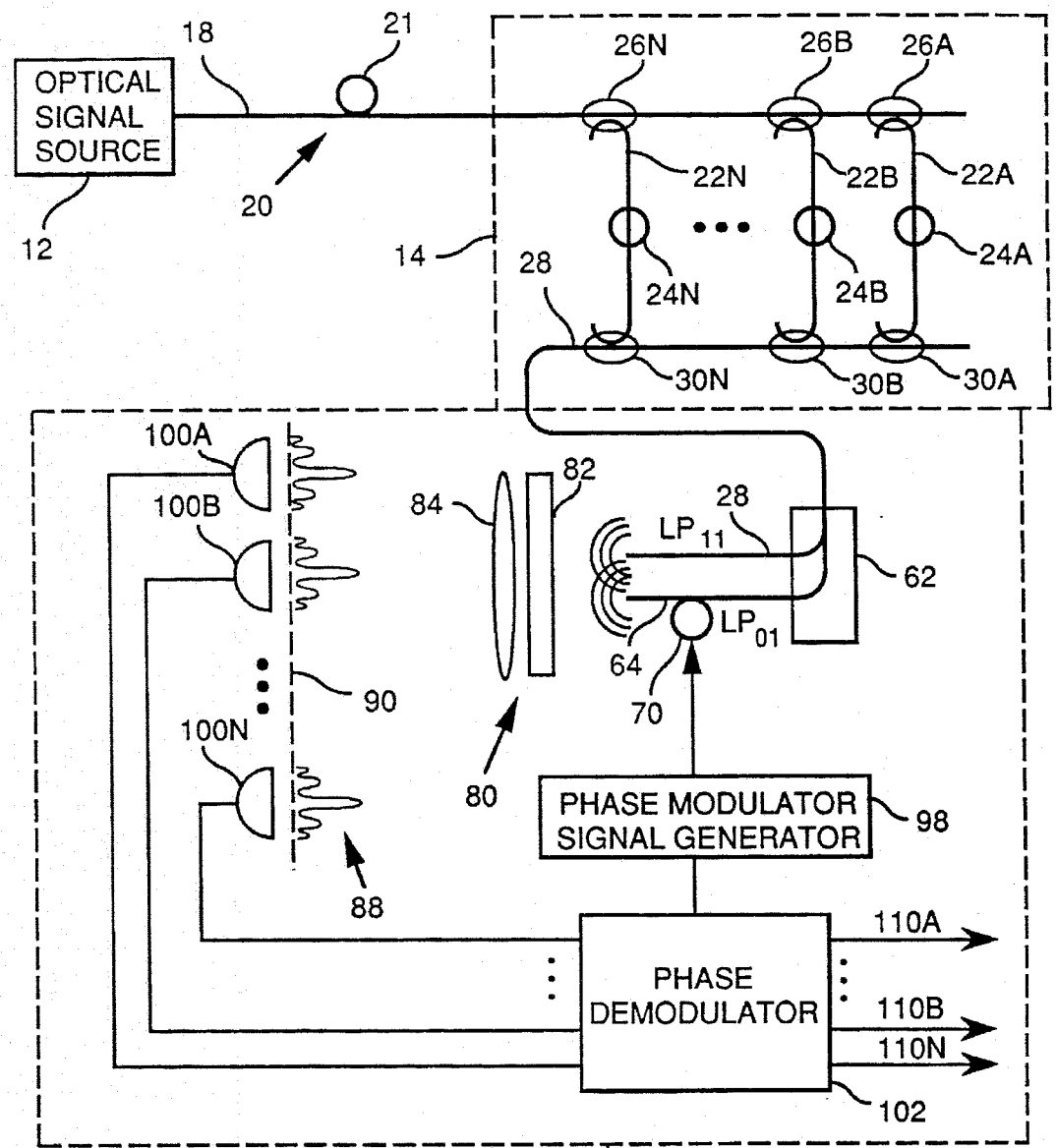
*FIG. 1*
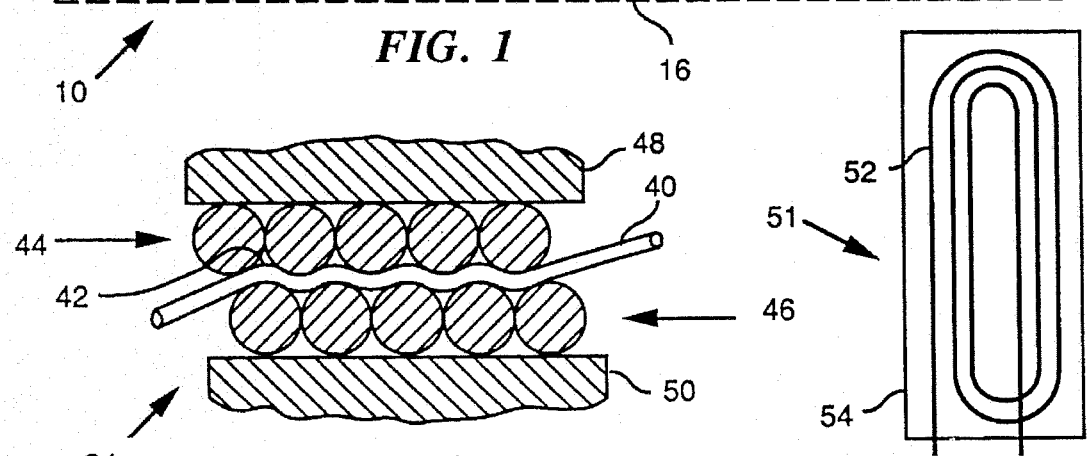
*FIG. 2*          *FIG. 3*

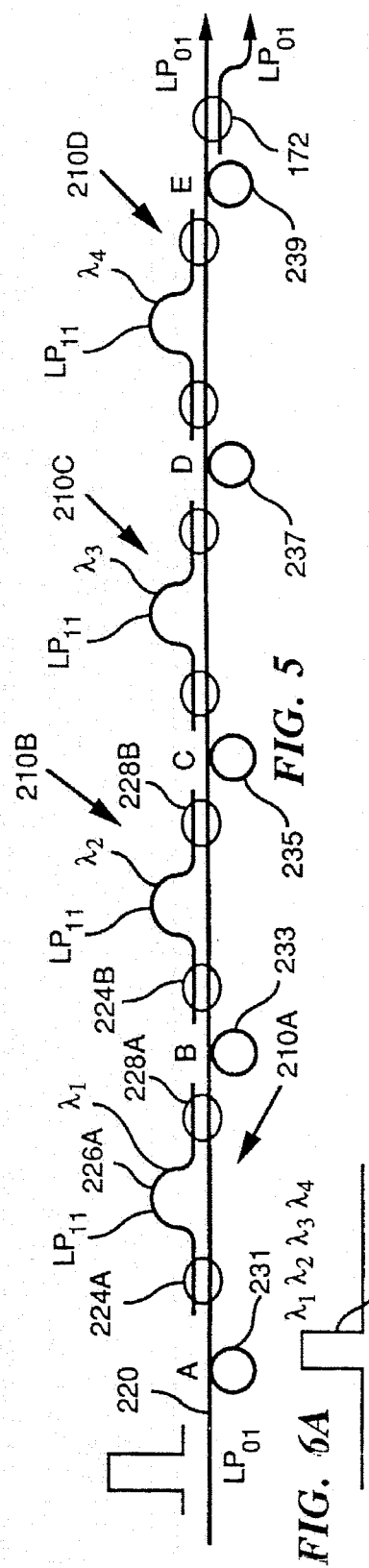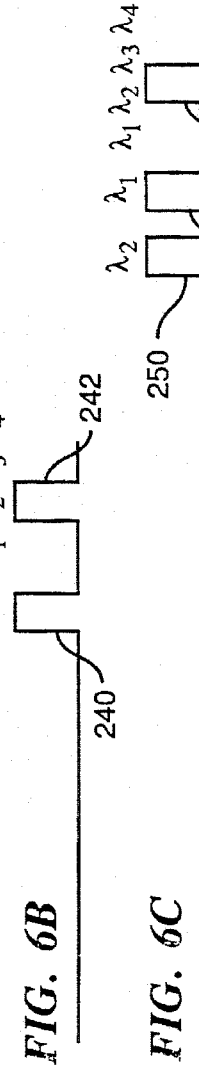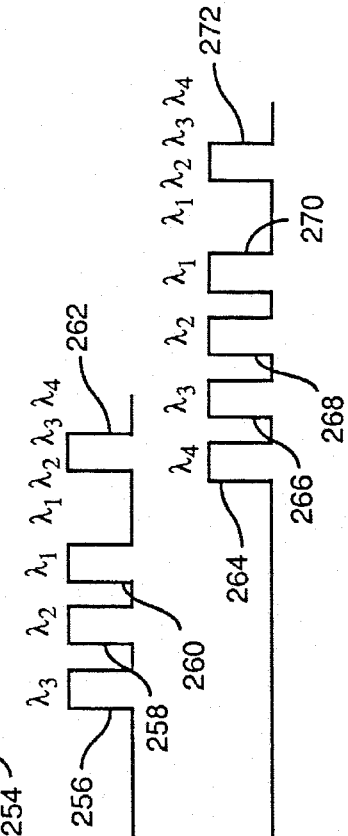

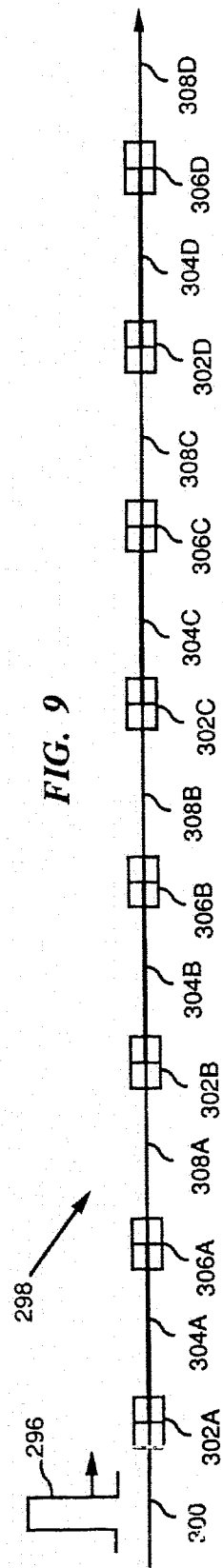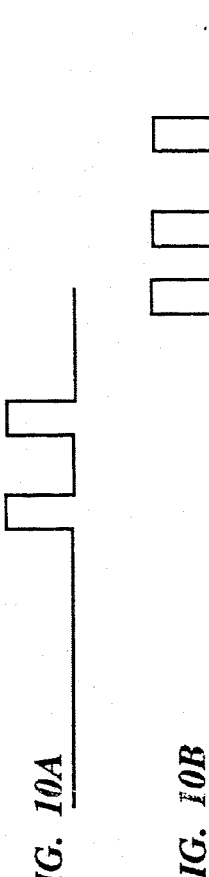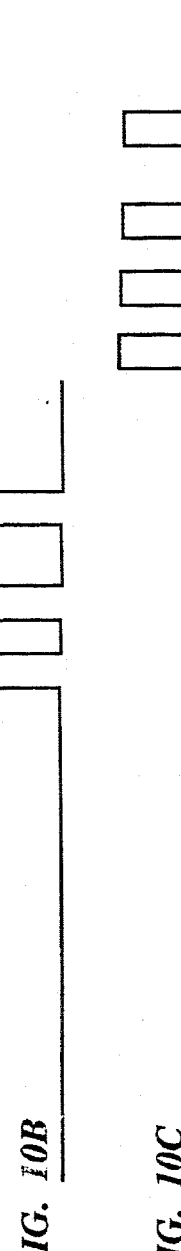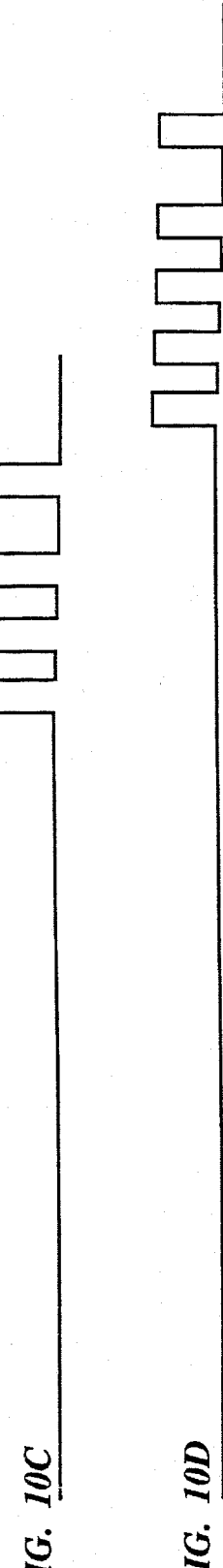

COHERENCE MULTIPLEXED INTERFEROMETRIC SIGNAL PROCESSING SYSTEM AND METHOD

This is a continuation-in-part of U.S. application Ser. No. 07/707,877 filed May 31, 1991 and now abandoned.

BACKGROUND OF THE INVENTION

This invention relates generally to fiber optic sensors and to processing signals output from fiber optic sensors. This invention relates particularly to a multiple sensor system and simultaneous and continuous processing of all signals output from the fiber optic sensors. Still more particularly, this invention relates to a technique for separating and simultaneously monitoring and processing optical signals output from a sensor system having a multiplicity of fiber optic interferometers that provide sensor signals to a single optical fiber.

Fiber optic sensors have a wide variety of applications for sensing parameters such as temperature, pressure, strain, acoustic waves, electromagnetic waves and rotation. Strain in an optical fiber produces an optical path length change by physically changing the length of the fiber and by changing its index of refraction by means of the photoelastic effect. A number of parameters may be measured when the optical fiber is mounted in a transducer that produces a strain in the fiber when the parameter of interest changes.

The most sensitive fiber optic sensors detect changes in a parameter of interest by monitoring interference between two signals. One or both of the optical signals are exposed to the parameter. The signals have different optical paths and experience a relative phase change as the parameter changes. Commonly used interferometric sensors include Mach-Zehnder, Michelson, Fabry-Perot, ring resonator, polarimetric and two-mode fiber interferometers. Most of these sensors have two separate fibers that form sensing and reference arms. A length of a single fiber may function as an interferometer if it guides two modes that exhibit different responses to changes in the parameter being measured.

Multiplexing of fiber optic sensors is well-known. Several techniques for multiplexing fiber optic sensor are described by Kim and Shaw, *Multiplexing of fiber optic sensors*, Optics News, November 1989, pp. 35–42. A number of fiber optic sensors may be connected together with single distribution and return fiber optic buses sharing optical and electronic components. Signals from individual sensors must be separated so that they may be monitored without interference with signals from other sensors. Techniques for separating the signals include time division multiplexing, frequency division multiplexing, coherence multiplexing and wavelength division multiplexing.

Most existing approaches to multiplexing fiber optic sensors are based on the differences in propagation time of the optical signal from the source to the detector for different sensors. Time division multiplexing has been used when the optical carrier is amplitude modulated. In such systems each input pulse travels through a fiber to all sensors in the system. Each sensor signal has a characteristic time delay that may be used to separate the sensor signals at the detector. The return pulses of all sensors propagate along a common fiber and appear as time multiplexed signals at the output of the fiber bus. Processing these signals therefore has to be performed in a fashion which demands time division. Both the integration time and signal to noise ratio in time-division-multiplexed sensor systems decrease as the number of sensors increases.

Kim and Shaw disclose a coherence multiplexing system that includes a plurality of pathlength mismatched fiber optic interferometric sensors and a plurality of corresponding compensating interferometers all connected to the same distribution fiber. The sensing interferometers are connected in series, and the compensating interferometers are connected in parallel. The compensating interferometers have the same pathlength mismatches as the corresponding sensing interferometers.

Each sensor has unbalanced arms having path length mismatches much longer than the coherence length of the source. The mismatches in the interferometers are different so that no two possible optical paths in the sensor part of the array have the same length. No interference occurs in any of the sensors before the signal from the source goes through the compensating interferometers. The compensating interferometer for a selected sensor brings uninterfered signals from that sensor within the coherence length of the source. Signals from the sensor then interfere with signals output from the corresponding compensating interferometer. An array of N sensor interferometers may have N separate compensating interferometers and detectors or the array may have one tunable compensating interferometer.

One difficulty with the prior art coherence multiplexing system is the increase in path length mismatch required as the number of sensors increases. Another difficulty is that the compensating interferometers must be arranged so that signals from the sensing interferometers interfere with the outputs of the corresponding compensating interferometers.

Wavelength division multiplexing may be accomplished by addressing individual sensors using wavelength-selective grating reflectors or directional couplers for each sensor in the array. Signals from a number of optical sources with different wavelengths are combined using a wavelength multiplexing coupler. Sensor interferometers are connected to the distribution and return fiber buses with multiplexing couplers. Each sensor is, therefore, monitored by an optical signal with a specific wavelength for each sensor. Signals from the return bus may be separated by a multiplexing coupler or an optical grating.

SUMMARY OF THE INVENTION

The present invention overcomes difficulties in previous fiber optic sensor arrays by providing a system and method that permits simultaneous and continuous monitoring of all of a plurality of fiber optic sensors. A sensing system according to the present invention comprises a plurality of interferometric sensors arranged in an array to monitor a selected parameter and means for providing two-mode optical signals to each of the plurality of interferometric sensors. The interferometric sensors may comprise a plurality of fiber optic interferometers arranged in either a parallel array or a series array. Each of the plurality of interferometric sensors is formed such that the two modes have different propagation velocities therein and such that each of the plurality of interferometric sensors produces an optical signal indicative of changes in the parameter. A return optical fiber receives signals output from each of the plurality of interferometric sensors. The sensor system preferably includes a single return fiber. The present invention also includes means for combining the first optical sensor signal output and the second optical sensor signal output to produce a plurality of spatially separated interference fringe patterns. Each interference fringe pattern corresponds to the optical signal output from a selected sensor. The present invention further includes means for monitoring the plurality of spatially separated interference fringe patterns simultaneously and continuously to detect changes in the parameter.

The sensing system according to the present invention comprises a Fourier transform lens arranged to receive the first and second optical sensor signal outputs and a grating arranged in relation to the Fourier transform lens such that the fringe patterns are spatially separated on the plane of the grating.

The sensors may each comprise a length of two-mode fiber connected between lengths of single mode fiber. The fibers preferably are butt-coupled with an offset between the cores so that portions of light guided by one of the single mode fibers are coupled into both modes of the two-mode fiber. The other single mode fiber receives energy from both modes of the two-mode fiber.

The sensing system may further include a modal filter for separating optical signals in the return fiber into a first optical sensor signal output and a second optical sensor signal output such that the first optical sensor signal output is in a first one of the two modes and the second optical sensor signal output is in the other of the two modes. The sensing system according to the present invention also preferably includes a first optical fiber for guiding the first optical sensor signal output and a second optical fiber for guiding the second optical sensor signal output along parallel optical paths for input to the Fourier transform lens.

The means for monitoring the plurality of spatially separated interference fringe patterns preferably includes phase modulator means for modulating the phase of one of the optical sensor signals, a plurality of photodetectors arranged such that each one of the plurality of photodetectors detects a corresponding fringe pattern and means for demodulating signals output from the plurality of photodetectors.

The sensing system may also include means for separating optical signals in the return optical fiber into a plurality of signal portions having both the first and second polarization modes therein.

BRIEF DESCRIPTION OF THE DRAWINGS

FIG. 1 schematically illustrates a ladder array of fiber optic sensors and a signal processing system according to the present invention;

FIG. 2 illustrates length of optical fiber having a multiplicity of microbends formed therein to form a modal coupler;

FIG. 3 illustrates a fiber optic strain sensor;

FIG. 5 illustrates a series array of fiber optic interferometric sensors;

FIGS. 6A–6E illustrate waveforms that exist at selected locations in the sensor array of FIG. 5 in response to a pulsed input;

FIG. 9 illustrates a second series array of fiber optic interferometric sensors; and FIGS. 10A–10D illustrate waveforms that exist at selected locations in the sensor array of FIG. 9 in response to a pulsed input.

DESCRIPTION OF THE PREFERRED EMBODIMENT

Figure 4:
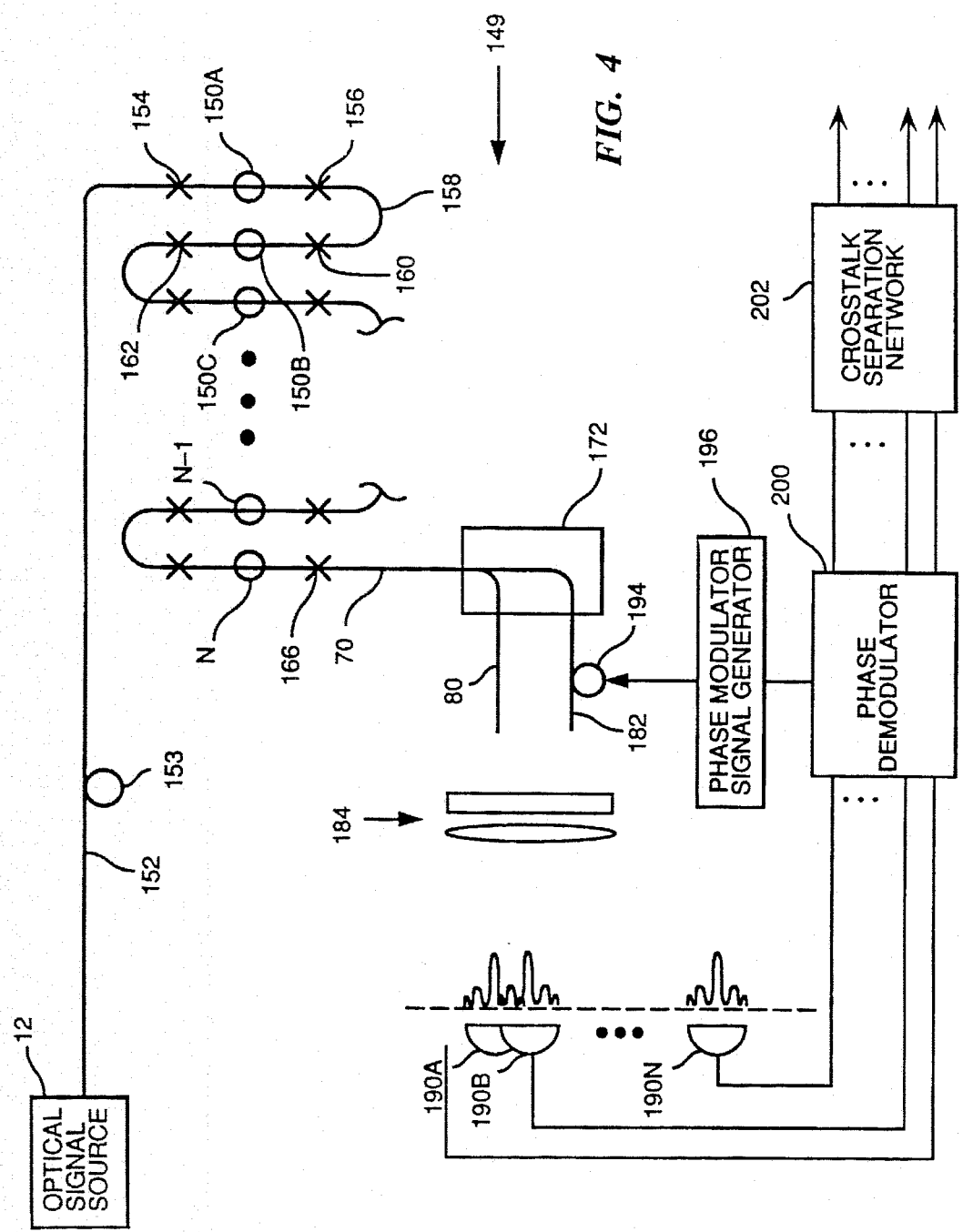
FIG. 4 illustrates a fiber optic sensor system having a plurality of fiber optic interferometric sensors connected in series and a signal processing system according to the present invention.

FIG. 1 schematically illustrates a sensor network 10 that includes an optical signal source 12, a sensor array 14 and processing circuitry 16. The optical signal source 12 provides means for supplying an input "white light" beam to a distribution optical fiber 18. The optical signal source 12 may be either a commercially available superluminescent diode (not shown) or a broadband fiber source (not shown). U.S. patent application Ser. Nos. 666,206 filed Mar. 7, 1991 and 652,534, filed Feb. 8, 1991 discloses a broadband fiber source that may be used as the optical signal source 12. The optical signal source 12 preferably has a coherence length of approximately 100–300 µm and preferably excites both the $LP_{01}$ and $LP_{11}$ modes in the distribution optical fiber 18.

The broadband fiber source includes a glass waveguide (not shown) that has been doped with a rare-earth material that includes Er/Yb/Al. A pump light source (not shown), which may be a high power laser diode, supplies power to the glass waveguide. The optically pumped glass waveguide produces output light having wavelengths in a broad bandwidth. The pump light preferably is separated from the output light by reflecting the light having the pump light wavelength back toward the input end of the waveguide and optically coupling the pump light from the waveguide.

The distribution optical fiber 18 should be capable of propagating two modes of electromagnetic energy and preferably is an elliptical-core fiber configured to guide the $LP_{01}$ and $LP_{11}$ modes. Such fibers are well-known in the art. The core (not shown) of the optical fiber 18 has an elliptical cross-section and is surrounded by a cladding (not shown) having a refractive index lower than that of the core. The dimensions of the core are such that the $LP_{01}$ and $LP_{11}$ modes in the core totally internally reflect back into the core at the core/cladding interface.

A mode stripper 20 eliminates the $LP_{11}$ mode from the distribution optical fiber 18, leaving only $LP_{01}$ mode to propagate to the sensor array 14. The mode stripper 20 may comprise a length of the optical fiber 18 wound around a generally cylindrical mandrel 21. If the diameter of the mandrel 21 is sufficiently small, the $LP_{11}$ mode radiates into the cladding while the $LP_{01}$ mode remains guided by the optical fiber 18. The mandrel 21 may have a diameter of about 0.64 cm, and the optical fiber 18 may be wrapped around the mandrel 21 about fifteen times.

The $LP_{01}$ mode propagates to a plurality of fiber optic couplers 26A, 26B, etc., formed to couple light from the distribution optical fiber 18 into a corresponding plurality of fibers 22A, 22B, etc. A plurality of sensors 24A, 24B, etc. are formed in the optical fibers 22A, 22B, etc. as explained in detail subsequently. The sensors 24A, 24B, etc. may be connected in a ladder configuration between the distribution optical fiber 18 and a return optical fiber 28. A plurality of fiber optic couplers 30A, 30B, etc. couples light from the corresponding optical fibers 22A, 22B, etc. into the return fiber 28.

The couplers 26A, 26B, etc. couple the $LP_{01}$ mode from the distribution fiber 18 into the fibers 22A, 22B, etc. and also preferably generate the $LP_{11}$ mode in the fibers 22A, 22B, etc. The fibers 22A, 22B, etc. then guide both modes to the corresponding sensors 24A, 24B, etc. Each of the couplers 26A, 26B, etc. may be a combination of a four port evanescent field fiber optic coupler and a fiber optic modal coupler.

FIG. 2 illustrates a type of modal coupler 34 that may be included in the output of portion of each of the couplers 26A, 26B, etc. This modal coupler is described by Blake, Kim & Shaw, *Fiber-optic modal coupler using periodic microbending*, Optice Letters, Vol. 11, No. 3, pp. 177–179, March 1986.

Referring to FIG. 2, a length of a birefringent fiber 40 has a plurality of microbends 42 formed therein. The $LP_{01}$ and $LP_{11}$ modes have different propagation velocities in the fiber 40 and therefore accumulate a phase difference as they propagate along the fiber 40. The microbends 42 are spaced apart by the beat length $L_B$ between the $LP_{01}$ and $LP_{11}$ modes. The microbends 42 may be achieved by placing a length of the optical fiber 40 between two sets of closely spaced, longitudinally aligned sets of cylinders 44 and 46. The sets of cylinders 44 and 46 may be offset as shown in FIG. 2 to form a series of small radius bends in the fiber 40. The sets of cylinders 44 and 46 may formed by wrapping wires around two rigid mandrels 48 and 50, respectively. The diameter of the wire may be about 0.025 cm.

The fiber 40 may be compressed between the wire-wrapped mandrels 48 and 50 to produce the microbends 42. A typical compressive load for achieving maximum coupling between the $LP_{01}$ and $LP_{11}$ modes is about 250 grams. In the present invention, approximately one half of the power in the $LP_{01}$ mode in each fiber 22A, 22B, etc. is coupled into the $LP_{11}$ mode. The optical signal source 12, the optical fiber 18, the mode stripper 20 and the couplers 26A, 26B, etc. provide means for introducing a two mode optical signal into each of the fiber optic sensors 24A, 24B, etc.

Each of the fiber optic sensors 24A, 24B, etc. preferably comprises a length of a single strand of elliptical core optical fiber. The single strand of elliptical core optical fiber functions as an interferometer because it guides the $LP_{01}$ and $LP_{11}$ modes and has different propagation constants for the two modes. The two modes have different velocities in the sensor fiber. The relative velocities of the two modes is dependent upon the length and refractive indices of the sensor fiber. Anything that changes either the length or the refractive indices of the sensor causes a change in the phase difference of the two modes.

The individual lengths of the sensor fibers are selected such that the difference in phase shift between any pair of all sensor elements is larger than the coherence length of the source. When the sensor array 14 is configured to detect acoustic signals, each sensor may comprise about 2 meters of optical fiber wound around a cylindrical mandrel (not shown) about 2.0 cm in diameter. Various structures for forming the separate sensors in an acoustic sensor system are known in the art. A suitable structure for an acoustic sensor that may be used in the present invention is disclosed in U.S. Pat. No. 4,799,792, which issued Jan. 24, 1989 to Carome. That patent is owned by Litton Systems, Inc., the owner of the present invention. The disclosure of U.S. Pat. No. 4,799,792 is hereby incorporated by reference into the present disclosure.

The sensors 24A, 24B, etc. in the sensor array 14 may also be configured as strain gauges. Elliptical core fiber is well suited for strain sensor measurements. Referring to FIG. 3, a strain gauge 51 includes a planar coil 52 of two mode optical fiber under tension affixed to a substrate 54 via a suitable adhesive (not shown). The substrate 54 is then attached to a structure (not shown) in which strain is to be measured. Changes in the dimensions of the substrate 54 change the optical path lengths of the two modes and thereby cause a phase change between them.

After passing through the fiber optic sensors 24A, 24B, etc., the optical signals impinge upon the corresponding plurality of couplers 30A, 30B, etc. The couplers 30A, 30B, etc. may be four port evanescent field couplers that couple the sensor signals into the return fiber 28, which is also a two-mode fiber. The couplers 30A, 30B, etc. should couple the $LP_{01}$ mode in the sensors 24A, 24B, etc. into the $LP_{01}$ mode in the return fiber 28 and should couple the $LP_{11}$ mode in the sensors 24A, 24B, etc. into the $LP_{11}$ mode in the return fiber 28. If the sensors 24A, 24B, etc. and the return fiber 28 are formed of elliptical core fiber, then the cores of the fibers are oriented to have their elliptic axes parallel in the couplers 30A, 30B, etc.

The return fiber 28 guides the sensor output signals to a mode filter 62. The mode filter 62 that provides means for separating the sensor signal into the $LP_{01}$ and the $LP_{11}$ modes. The $LP_{01}$ and the $LP_{11}$ mode are then output from the mode filter 62 via the optical fiber 28 and an optical fiber 64, respectively.

Figure 7:
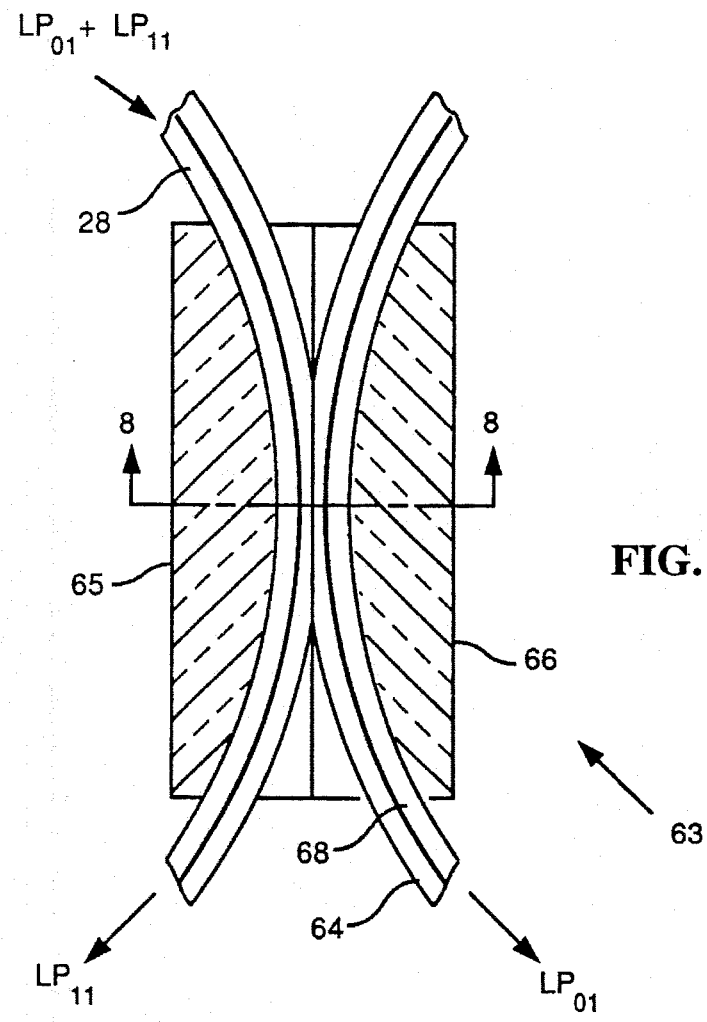
FIG. 7 is a partial cross sectional view of a fiber optic mode filter that may be included in the signal processing system of FIG. 1.

Referring to FIG. 7, the mode filter may be formed as an evanescent field coupler 63 that couples all of the energy in the $LP_{01}$ mode from the two mode return fiber 28 into the optical fiber 64. The coupler 63 may be formed in a manner similar to the coupler disclosed in U.S. Pat. No. 4,493,528, which issued Jan. 15, 1985 to Shaw et al. The disclosure of U.S. Pat. No. 4,493,528 is hereby incorporated by reference into the present disclosure.

Figure 8:
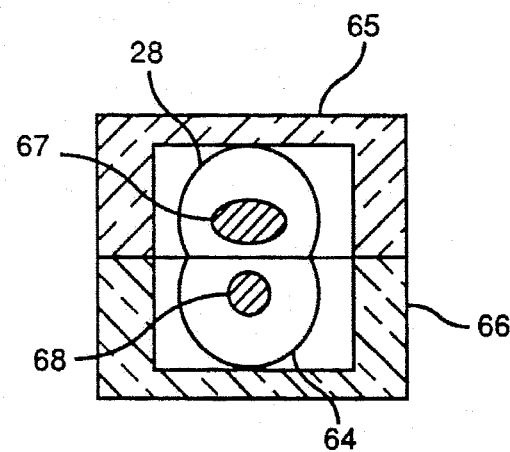
FIG. 8 is a cross sectional view about line 8—8 of FIG. 7.

Still referring to FIG. 7, a curved section of the two mode fiber 28 and a curved section of a the fiber 64 are mounted in substrates 65 and 66, respectively. The substrates 65 and 66 and the fibers 28 and 64 are machined to depths sufficient to permit interaction between the evanescent fields of waves guided by the fibers 28 and 64. The substrates 65 and 66 are then placed face-to-face as shown in FIGS. 7 and 8 to place the cores of the fibers 28 and 64 in proximity. If the major axis of the elliptical core 67 of the fiber 28 is oriented parallel to the interface between the fibers 28 and 64, then the energy in the $LP_{01}$ mode that had been guided by the fiber 28 couples into the circular core 68 of the fiber 64. If the coupling coefficient is 100%, then the output of the coupler will comprise the $LP_{11}$ mode in the fiber 28 and the $LP_{01}$ mode in the fiber 64.

The signal guided by one of these two fibers 64 and 28 preferably is phase modulated. By way of example, FIG. 1 shows a phase modulator 70 configured to modulate the phase of signals in the $LP_{11}$ mode, which are guided by the optical fiber 64. U.S. Pat. No. 4,789,240, which issued Jan. 24, 1989 to Bush, discloses a phase modulator structure suitable for practicing the present invention. That patent is owned by Litton Systems, Inc., the owner of the present invention. The disclosure of U.S. Pat. No. 4,789,240 is hereby incorporated by reference into the present disclosure.

The phase modulator 70 may be formed by wrapping a length of the optical fiber 64 around a piezoelectric mandrel (not shown). Application of a suitable electrical signal to electrodes (not shown) attached to the piezoelectric mandrel cause the diameter of the mandrel to change. Changes in diameter of the piezoelectric mandrel cause changes the length and refractive index of the fiber 64. Length and refractive index changes in the fiber 64 change the phase of the optical signal guided by the optical fiber 64.

The optical fibers 64 and 28 are preferably parallel and closely spaced. The optical fibers 64 and 28 are essentially point light sources that emit spherical wavefronts that are directed to a lens system 80. The lens system 80 has an optic axis that is parallel to the fibers 64 and 28. The lens system 80 preferably includes an astigmatic lens 82 and a Fourier transform lens 84. The optical signals output from the optical fiber 64 and 28 are at the input plane of the Fourier transform lens 84. The Fourier transform lens 84 preferably forms a one dimensional Fourier transform having a single Fourier transform within the plane of the paper and having a double Fourier transform, which corresponds to an inverted image, in the plane orthogonal to the plane of the paper.

Still referring to FIG. 1, the arrangement of the optical fibers 64 and 28 at the input plane to the Fourier transform lens 84 causes a plurality of fringe patterns 88 to form in a plane. These fringe patterns 88 are the Fourier transforms of the light incident upon the Fourier transform lens 84. The fringe patterns are spaced apart by a distance determined by the spacing between the ends of fibers 28 and 64, the focal length of the lens system 80 and the wavelengths of the optical signals. The lens system 80 thus provides means for combining the first optical sensor signal output and the second optical sensor signal output to produce a plurality of spatially separated interference fringe patterns. A transmission grating 90 is placed in the plane where the fringes form to receive the fringe patterns 88. Due to the limited coherence length of the optical signal source 12 and to the phase delays provided for the optical path through each sensor, each fringe pattern represents the self-coherence function of the optical signal source 12.

The location of each fringe pattern in the plane of the transmission grating is determined by the phase delays which are typical for each sensor. A plurality of photodetectors 100A, 100B, etc. are located behind the grating 90. The locations and dimensions of the detectors 100A, 100B, etc. should be dimensioned such that each detector 100A, 100B, etc. integrates the light contained in each fringe pattern. The transmission grating 90 preferably has a groove spacing identical to that of the fringe spacing. Therefore, the grating 90 may be used to transmit selected incident optical signals or block them from reaching the detectors 100A, 100B, etc.

A phase modulator signal generator 98 is connected to the phase modulator 70. In order to provide a high accuracy demodulation of the sensor phase information contained in each fringe system, the phase modulator signal generator 98 drives the phase modulator 70 with an AC signal such that the light phase in the fiber 64 swings through a phase shift of several $2\pi$ increments. This causes all fringe systems in the plane of the grating 90 to perform a lateral movement in synchronism with the signal applied to the phase modulator 70. Since all fringe systems sweep over the plane of the grating 90 before exposing the photodetectors 100A, 100B, etc., the AC signal provided by each photodetector 100A, 100B, etc. contains the phase information which corresponds to the respective sensor.

The detectors 100A, 100B, etc. provide electrical signals to a phase demodulator 102. The phase modulator signal generator 98 provides a reference signal to the phase demodulator 102. A phase comparison in the phase demodulator 102 of the signals from the detectors 100A, 100B, etc. with the reference signal provides the phase demodulated output signals 110A, 110B, etc. The lens system 80, the photodetectors 100A, 100B, etc., the phase modulator 98 and the phase demodulator 102 comprise means for monitoring the plurality of spatially separated interference fringe patterns simultaneously and continuously to detect changes in the parameter.

A DC signal applied to one of the sensors 24A, for example, that causes a 10° change in the phase difference between the $LP_{01}$ and $LP_{11}$ modes causes a corresponding 10° change in the position of the fringe output to photodetector 100A. A strain sensor 51 as illustrated in FIG. 3 may produce such a DC signal.

An AC signal input to the sensor 24A produces a corresponding phase modulation of the signal output to the photodetector 100A. This is the type of signal produced in an acoustic sensing system. A sound wave comprises periodic pressure variations on the sensors 24A, 24B, etc., which produce signals that are detected as phase modulation of the fringe patterns incident upon the respective photodetectors 100A, 100B, etc.

FIG. 4 illustrates a sensor system 149 according to the present invention in which a plurality of fiber optic sensors 150A, 150B, etc. are connected in series. The optical signal source 12 provides pulsed optical signal to an optical fiber 152. The optical fiber 152, like the optical fiber 18, is a two mode fiber and preferably is an elliptical core fiber configured to guide the $LP_{01}$ and the $LP_{11}$ modes. The optical signal source 12 preferably excites the $LP_{01}$ and the $LP_{11}$ modes in the optical fiber 152. A mode stripper 153 removes the $LP_{11}$ modes from the optical fiber 152 so that only the $LP_{01}$ mode propagates to the sensor 150A.

Before reaching the first sensor 150A, the optical signal propagates through a modal coupler 154. The modal coupler 154 couples part of the incident signal having a selected wavelength $\lambda_1$ into the $LP_{11}$ mode. The modal coupler 154 preferably is a 50/50 coupler so that half of the incident optical signal having the wavelength $\lambda_1$ is in each polarization.

After propagating through the first sensor 150A, the optical signal is then incident upon a second modal coupler 156. The modal coupler 156 couples a large portion of the energy incident thereon back into the $LP_{01}$ mode. The signal then propagates through a length of optical fiber 158 before reaching another modal coupler 160, which converts part of the signal having a wavelength $\lambda_2$ back into the $LP_{11}$ mode before the signal reaches the second sensor 150B. After propagating through the second sensor 150B, the optical signal impinges upon a modal coupler 162, which converts the signal having the wavelength $\lambda_2$ back into the $LP_{10}$ mode. The sensor array then may be considered as having wavelength sensitive modal couplers connected to both sides of each sensor.

The paper by Blake, Kim & Shaw referenced above explains how the modal coupler as shown in FIG. 2 has wavelength sensitive coupling characteristics. The modal coupler may be made wavelength selective by adjusting the number of bends in the fiber at each coupler.

After the optical signal has passed through all the sensors, a modal coupler 166 converts the optical signal into a sensor output signal having only the $LP_{01}$ mode. The sensor output signal propagates through a length of optical fiber 170 to a coupler 172, which divides the sensor output signal between two essentially parallel optical fibers 180 and 182.

The sensing system 149 may include components essentially identical to those described with reference to FIG. 1. The sensing system 149 may therefore include a lens system 184, a grating 186, photodetectors 190A, 190B, etc., a phase modulator 194, a phase modulator signal generator 196, a phase demodulator 200. The sensor arrays may produce cross talk between the sensor signals. A crosstalk separation network 202 connected to the phase demodulator 200 eliminates this crosstalk from the output. The crosstalk separation network 202 may be formed to include filters (not shown) that remove undesired wavelength components from the output pulses.

The method of operation of the sensor system of FIG. 4 may be more readily understood by considering FIGS. 5 and 6A–6E. FIG. 5 illustrates four Mach-Zehnder interferometers 210A, 210B, 210C and 210D in series. An optical signal pulse having a bandwidth of about 150 nm and a duration of about 0.75 ps is guided by an optical fiber 220, which forms one leg of each of the Mach-Zehnder interferometers 210A, 210B, 210C and 210D. For the purpose of explaining the method of operation of the sensor system 149, the pulse may be divided into four wavelength bands having center wavelengths $\lambda_1$, $\lambda_2$, $\lambda_3$, and $\lambda_4$. A pulse 230 in FIG. 6A represents the optical signal at point A in FIG. 5. The optical signal pulse 230 passes through a mode stripper 231 located at point A in the optical fiber 220. The mode stripper 231 removes all modes from the optical signal pulse except for the $LP_{01}$ mode.

The Mach-Zehnder interferometer 210A comprises an optical coupler 224A that couples part of the incident $LP_{01}$ pulse into the $LP_{11}$ mode. The $LP_{11}$ mode in the Mach-Zehnder interferometer 210A is represented by a line 226A. It should be understood that the line 226A is merely an aid to understanding the method of operation of the invention. The line 226A is not a separate fiber. All the energy in the Mach-Zehnder interferometer 210A is in the single optical fiber 220.

The $LP_{01}$ mode optical pulse contains the wavelengths $\lambda_1$, $\lambda_2$, $\lambda_3$, and $\lambda_4$ when it impinges upon the coupler 224A. The optical coupler 224A preferably is a wavelength-selective modal coupler that couples 226A only light of a selected wavelength, $\lambda_1$, for example, into the $LP_{11}$ mode. A modal coupler 228A couples part of the light in the $LP_{11}$ mode back into the $LP_{01}$ mode. A mode stripper 233 at point B in the optical fiber 220 removes from the optical fiber 220 any remaining light in the $LP_{11}$ mode.

The portion of the fiber 220 between the couplers 224A and 228A where both the $LP_{01}$ and the $LP_{11}$ modes propagate comprises the first and second arms, respectively, of the Mach-Zehnder interferometer 210A. Light having the wavelength $\lambda_1$ and in the $LP_{11}$ mode in the optical fiber 220 and light having the wavelength $\lambda_1$ and in the $LP_{01}$ mode in the optical fiber 220 will in general have different propagation velocities.

The $LP_{11}$ mode is the slow wave. The length of the optical fiber 220 between the modal couplers 224A and 228A is such that the slow wave pulse in the $LP_{11}$ mode having the wavelength $\lambda_1$ becomes separated with respect to the portion of the signal in the $LP_{01}$ mode. When the coupler 228A combines the light in the $LP_{11}$ mode with the light in $LP_{01}$ mode, the result is a pulse 240 having the wavelength $\lambda_1$ and a pulse 242 having wavelengths $\lambda_1$, $\lambda_2$, $\lambda_3$, and $\lambda_4$ as shown in FIG. 6B. The pulse heights are not drawn to any scale. Exposing the Mach-Zehnder interferometer 210A to a parameter such as an acoustic wave modulates the pulse having the wavelength $\lambda_1$.

The Mach-Zehnder interferometer 210B includes a modal coupler 224B that couples part of the light having the wavelength $\lambda_2$ into the $LP_{11}$ mode in the optical fiber 220. The $LP_{11}$ mode in the Mach-Zehnder interferometer 210B is represented by a line 226B, which like the line 226A is not a separate fiber. The pulse 240 having the wavelength $\lambda_1$ remains in the $LP_{01}$ mode in the optical fiber 220 along with the uncoupled portion of the pulse 242. The Mach-Zehnder interferometer 210B functions in a manner similar to that described above for the Mach-Zehnder interferometer 210A. When the coupler 228B combines the pulses so that they are all in the $LP_{01}$ mode, the result is three pulses. The slow mode in the Mach-Zehnder interferometer 210B has a wavelength $\lambda_2$ and appears in the output of the coupler 228B as a separate pulse 250 at point C in the optical fiber 220. Pulses 252 and 254 having wavelengths $\lambda_1$ and wavelengths $\lambda_1$, $\lambda_2$, $\lambda_3$, and $\lambda_4$, as shown in FIG. 6C, also appear at point C.

Mode strippers 235, 237 and 239 at points C, D and E in the optical fiber 220 remove any remaining light in the $LP_{11}$ mode so that only energy in the $LP_{01}$ mode is input to the Mach-Zehnder interferometers 210C and 210D and to the coupler 172.

The Mach-Zehnder interferometers 210C and 210D function similarly to the Mach-Zehnder interferometers 210A and 210B. Each provides output pulses having the same wavelengths as the input pulses in addition to a new pulse of light having a selected wavelength. The Mach-Zehnder interferometer 210C therefore provides separate output pulses 256, 258 and 260 having the wavelengths $\lambda_3$, $\lambda_2$, $\lambda_1$, respectively, and a single pulse 262 having all four wavelengths $\lambda_1$, $\lambda_2$, $\lambda_3$, $\lambda_4$, as shown in FIG. 6D. Similarly the Mach-Zehnder interferometer 210D provides separate output pulses 264, 266, 268 and 270 having the wavelengths $\lambda_4$, $\lambda_3$, $\lambda_2$, $\lambda_1$, respectively, and a single pulse 272 having all four wavelengths $\lambda_1$, $\lambda_2$, $\lambda_3$, and $\lambda_4$, as shown in FIG. 6E. The coupler 172 then divides the pulses into two beams that are both in the $LP_{01}$ mode for input to the lens system 184.

Both embodiments of the invention described above have the advantage of permitting the simultaneous and continuous processing of all sensor signals. The present invention therefore provides for an enhanced signal to noise ratio over prior art systems for processing signals output from fiber optic sensor arrays.

FIG. 9 illustrates a third embodiment of a sensor array that may be used in the present invention. Referring to FIG. 9, a series array 296 of fiber optic interferometric sensors may be formed using lengths of single mode fiber and two-mode fiber butt-coupled together. A pulsed optical signal 298 propagates in a single mode fiber 300 to a butt-coupling 302A formed between the single mode fiber 300 and a two-mode fiber 304A. The two-mode fiber 304A is preferably an elliptical core fiber like the fiber 28 shown in FIG. 8. The single mode fiber 300 guides the $LP_{01}$ mode to the butt coupling 302A. The fibers 300 and 304A are fused together end-to-end with a slight offset between their longitudinal axes so that a small fraction of the light incident upon the butt coupling 302A is coupled into the $LP_{11}$ mode in the two-mode fiber 304A. Preferably about one to three percent of the incident light that had been in the $LP_{01}$ mode is coupled into the $LP_{11}$ mode in the two-mode fiber 304A.

Therefore both the $LP_{01}$ mode and the $LP_{11}$ mode propagate in the two-mode fiber 304A to a second butt coupling 306A. The butt-coupling 306A is formed to couple most of the $LP_{01}$ mode light from the two-mode fiber 304A into a single mode fiber 308A. A small part of the $LP_{11}$ mode light is coupled from the two-mode fiber 304A into the single mode fiber 308A. The portion of $LP_{11}$ mode light coupled from the two-mode fiber 304A into the single mode fiber 308A preferably is about one to three percent.

The $LP_{01}$ mode and the $LP_{11}$ mode have different propagation velocities in the two-mode fiber 302A. Therefore, the pulses of optical energy that had been in the $LP_{01}$ mode and the $LP_{11}$ mode are separated in time when they couple into the single mode fiber 308A. The amount of time separation depends upon the length of the two-mode fiber 304A and the difference of the effective refractive indices for each of the two modes. Changes in a physical parameter, such as acoustic pressure, to which the two-mode fiber 304A is exposed changes the time separation of the two pulses. The single mode fiber 300, the butt coupling 302A, the two-mode fiber 304A, the butt coupling 306A and the single mode fiber 308A therefore form an interferometric sensor with single mode fiber inputs and outputs.

The array 296 also includes lengths of two-mode fibers 304B, 304C and 304D, single mode fibers 308B, 308C and 308D and butt couplings 302B, 302C, 302D, 306B, 306C and 306D between the two mode fibers and the single mode fibers, which also form interferometric sensors. The array 296 with the four sensors is merely illustrative of an array that may be formed using the basic principles of the invention.

It is to be understood that none of the components shown in FIG. 9 are drawn to any scale. In particular it should be noted that the lengths of the two-mode fibers 304A, 304B, 304C and 304D in general will be different to provide different spacing between the signals output from the sensors. The lengths of the single mode fibers 304A–304C are chosen to correspond to the desired distance between the sensors.

Referring to FIG. 10, in response to the input pulse 298, the array 296 produces the pulsed outputs of FIG. 10A–FIG. 10D. The two pulses of FIG. 10A are output from the butt-coupling 306A. The coupling 306B outputs three pulses as shown in FIG. 10B. The pulses of FIG. 10C and FIG. 10D are output from the butt-couplings 306C and 306D, respectively. The magnitudes of the pulses depend on the coupling ratios for the $LP_{01}$ mode and $LP_{11}$ mode at each of the couplings 302A–302D and 306A–306D.

An advantage of the sensor array of FIG. 9 is that many sensors can be multiplexed in series if the splices 302A, 302B, etc. and the splices 306A, 306B, etc. are made so that most of the light remains in the $LP_{01}$ mode in all the optical fibers and a few percent (between one and three) of the light in the $LP_{01}$ mode in the single mode optical fibers is coupled into the $LP_{11}$ mode in the dual mode fibers 304A–304D. A similar fraction of this light in the $LP_{11}$ mode of the dual mode fiber is coupled back into the $LP_{01}$ mode of the single mode fiber. Therefore all the splices in the array 296 may be substantially identical.

Using the sensor array 296 reduces the number of components, allows more fiber optic sensors to operate in series between single fiber input and output lines and allows the sensor system to perform with greater stability over a wider range of environmental conditions.

The amount of light between the $LP_{01}$ mode in the single mode fibers 300 and 308A–308C and the $LP_{11}$ mode in the dual mode fibers 304A–304D can be chosen to be small enough so that cross talk signals appearing in the output of the array 296 are below an acceptable amplitude. The process of fabricating the modal couplers for an array involves defining the number of sensors in series and the acceptable level of interference due to cross talk. In this way a suitable signal to noise ratio can be maintained. The signal is formed by interference fringes formed with light that has passed through the $LP_{11}$ mode in a given length of dual mode fiber that has been formed into a particular sensor. Noise is formed by cross talk due to interference fringes formed with light having passed through the $LP_{11}$ mode in other lengths of dual mode fiber included in other sensors in the series.

A cross talk separation network 202 in FIG. 4 is then not needed. The appropriate modal coupling ratio can be produced in the fusion splice by causing small lateral movements of one fiber relative to the other (movements parallel to the major axis of the ellipse of the core of the dual mode fiber) before the fibers are joined. Light exiting the fibers can be monitored during the process so that the medal coupling ratio can be adjusted to the proper level before the fibers are joined.

Because the cross talk signals can be maintained at suitably low levels, they can be present continuously and the system need not have a pulsed light source as had been described with reference to FIG. 4. The optical signal source 12 can be allowed to run continuously when it supplies light to the sensing array 296.

However, because the splices included in the array 296 of FIG. 9 join single mode fiber and dual mode fiber at the positions indicated by modal couplers 302A–302D and 306A–306D, the lengths of optical fiber between dual mode fiber sensors may be formed of single mode fiber. The mode strippers indicated as 233, 235 etc. in FIG. 5 are not necessary in the array 296 because the $LP_{11}$ mode the mode strippers would remove is not present between the sensors.

The array 296 does not require tuning the modal couplers to specific wavelengths as shown in FIG. 5. This wavelength tuning requires extra care, and the wavelength division multiplexing causes the number of sensors that can multiplexed in series to be limited by the bandwidths of the optical signal source and modal couplers.

The splices in the array 296 302A–302D and 306A–306D can be sealed within the sensors so that only single mode fibers 300 and 308D are exposed. This means that lengths of dual mode fiber can be formed into individual sensors with single mode fiber pigtails extending from them. These sensors can be joined to form a series array by joining single mode fibers attached to individual sensors rather than having to form an entire series of sensors form one unbroken length of dual mode fiber. Should the single mode fiber between sensors break or should a sensor become damaged, the break could be repaired or the sensor replaced without concern for having to control the modal coupling that would occur between sensors or having to add extra mode strippers between sensors as would be the case if the entire series were composed of only dual mode fiber.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic sensing system for monitoring a selected parameter, comprising:

a plurality of fiber optic interferometric sensors connected in an array;

means for introducing two-mode optical signals into each of the plurality of fiber optic interferometric sensors such that each of the plurality of fiber optic interferometric sensors produces an optical signal indicative of changes in the parameter;

a Fourier transform lens arranged to receive the optical signals indicative of changes in the parameter and to provide a lens output signal that includes a plurality of spatially separated interference fringe patterns, each interference fringe pattern corresponding to the optical signal output from a selected one of the plurality of interferometric sensors;

a transmission grating arranged to receive the plurality of spatially separated interference fringe patterns, the transmission grating having a groove spacing corresponding to the spatially separated interference fringe patterns such that the fringe patterns are transmitted through the grating; and means for monitoring the plurality of spatially separated interference fringe patterns simultaneously and continuously to detect changes in the parameter.

2. A sensing system for monitoring a selected parameter, comprising:

a plurality of interferometric sensors connected in an array;

means for providing two-mode optical signals to each of the plurality of interferometric sensors, each of the plurality of interferometric sensors being formed such that the two modes have different propagation velocities therein and such that each of the plurality of interferometric sensors produces an optical sensor signal indicative of changes in the parameter;

a single return optical fiber for receiving output signals from each of the plurality of interferometric sensors;

means for combining the optical sensor signals output from the plurality of interferometric sensors to produce a plurality of spatially separated interference fringe patterns, each interference fringe pattern corresponding to the optical signal output from a selected sensor, including:

a Fourier transform lens arranged to receive the optical sensor signals; and a grating arranged in relation to the Fourier transform lens such that the fringe patterns form spatially separated on the grating; and means for monitoring the plurality of spatially separated interference fringe patterns simultaneously and continuously to detect changes in the parameter.

3. The sensing system of claim 2 further including a modal filter for separating optical signals in the return fiber into a first optical sensor signal output and a second optical sensor signal output such that the first optical sensor signal output is in a first one of the two modes and the second optical sensor signal output is in the other of the two modes.

4. The sensing system of claim 3 including a first optical fiber for guiding the first optical sensor signal output and a second optical fiber for guiding the second optical sensor signal output along parallel optical paths for input to the Fourier transform lens.

5. The sensing system of claim 4 wherein the means for monitoring the plurality of spatially separated interference fringe patterns includes:

phase modulator means for modulating the phase of one of the optical sensor signals;

a plurality of photodetectors arranged such that each one of the plurality of photodetectors detects a corresponding fringe pattern; and means for demodulating signals output from the plurality of photodetectors.

6. The sensing system of claim 2 wherein the means for monitoring the plurality of spatially separated interference fringe patterns includes:

phase modulator means for modulating the phase of the optical sensor signals before they are incident upon the Fourier transform lens;

a plurality of photodetectors arranged such that each one of the plurality of photodetectors detects a corresponding fringe pattern; and means for demodulating signals output from the plurality of photodetectors.

7. The sensing system of claim 2 wherein the plurality of interferometric sensors comprises a plurality of fiber optic interferometers arranged in a parallel array.

8. The sensing system of claim 7 wherein each of the fiber optic sensors guides a first polarization mode along a first optical path and a second polarization mode along a second optical path.

9. The sensing system of claim 2 wherein the plurality of interferometric sensors comprises a plurality of fiber optic interferometers arranged in a series array, each fiber optic interferometer being formed to produce an output signal of a selected wavelength.

10. The sensing system of claim 9 wherein each of the fiber optic interferometers guides a first polarization mode along a first optical path and a second polarization mode along a second optical path.

11. The sensing system of claim 10 including means for separating optical signals in the return optical fiber into a plurality of signal portions having both the first and second polarization modes therein.

12. A sensing system for monitoring a selected parameter, comprising:

a plurality of interferometric sensors arranged in an array, the plurality of fiber optic interferometers being arranged in a series array, each fiber optic interferometer being formed to guide a first polarization mode along a first optical path and a second polarization mode along a second optical path, each fiber optic interferometer being formed to produce an output optical signal of a selected wavelength;

means for providing two-mode optical signals to each of the plurality of interferometric sensors, each of the plurality of interferometric sensors being formed such that the two modes have different propagation velocities therein and such that each of the plurality of interferometric sensors produces an optical signal indicative of changes in the parameter;

a single return optical fiber for receiving output signals from each of the plurality of interferometric sensors;

means for separating optical signals in the return optical fiber into a plurality of signal portions having both the first and second polarization modes therein;

means for combining the plurality of signal portions to produce a plurality of spatially separated interference fringe patterns, each interference fringe pattern corresponding to the optical signal output from a selected sensor, including:

a Fourier transform lens arranged to receive the first and second optical sensor signal outputs; and a grating arranged in relation to the Fourier transform lens such that the fringe patterns form spatially separated on the grating; and means for monitoring the plurality of spatially separated interference fringe patterns simultaneously and continuously to detect changes in the parameter.

13. A method for forming an interferometric sensing system for monitoring a selected parameter, comprising the steps of:

arranging a plurality of fiber optic interferometric sensors in an array to monitor the selected parameter;

providing two-mode optical signals to each of the plurality of fiber optic interferometric sensors, each of the plurality of fiber optic interferometric sensors being formed such that the two modes have different propagation velocities therein and such that each of the plurality of interferometric sensors produces an optical signal indicative of changes in the parameter;

receiving output signals output from each of the plurality of interferometric sensors on a return optical fiber;

coupling optical signals having a first polarization in the return fiber into a first fiber to form a first optical sensor signal output;

coupling optical signals having a second polarization in the return fiber into a second fiber to form a second optical sensor signal output;

arranging the first and second fibers such the first and second optical sensor signal outputs are emitted from the first and second fibers so that the first and second optical sensor signal outputs interfere to form a plurality of spatially separated interference fringe patterns, each interference fringe pattern corresponding to the optical signal output from a selected sensor;

arranging a Fourier transform lens to receive the interference fringe patterns and produce a Fourier transform thereof;

arranging a transmission grating to receive the Fourier transform of the interference fringe patterns thereon;

providing a groove spacing in the transmission grating equal to the spatial separation of the interference fringe patterns on the grating; and monitoring the plurality of spatially separated interference fringe patterns simultaneously and continuously to detect changes in the parameter.

14. A method for forming a sensing system, comprising the steps of:

arranging a plurality of interferometric sensors in an array to monitor a selected parameter;

providing two-mode optical Signals to each of the plurality of interferometric sensors, each of the plurality of interferometric sensors being formed such that the two modes have different propagation velocities therein and such that each of the plurality of interferometric sensors produces an optical signal indicative of changes in the parameter;

receiving output signals output from each of the plurality of interferometric sensors on a single return optical fiber;

separating optical signals in the return fiber into a first optical sensor signal output and a second optical sensor signal output;

combining the first optical sensor signal output and the second optical sensor signal output to produce a plurality of spatially separated interference fringe patterns, each interference fringe pattern corresponding to the optical signal output from a selected sensor by the steps of;

receiving the first and second optical sensor signal outputs with a Fourier transform lens; and arranging a grating in relation to the Fourier transform lens such that the fringe patterns form on the grating with the fringe patterns being spatially separated; and monitoring the plurality of spatially separated interference fringe patterns simultaneously and continuously to detect changes in the parameter.

15. The method of claim 14 wherein the step of separating optical signals in the return fiber into a first optical sensor signal output and a second optical sensor signal output includes using a modal filter to divide the optical signals in the return fiber such that the first optical sensor signal output is in a first one of the two modes and the second optical sensor signal output is in the other of the two modes.

16. The method of claim 15 including guiding the first optical sensor signal output with a first optical fiber and guiding the second optical sensor signal output with a second optical fiber along parallel optical paths for input to the Fourier transform lens.

17. The method of claim 16 wherein the step of monitoring the plurality of spatially separated interference fringe patterns includes the steps of:

modulating the phase of one of the optical sensor signals;

detecting the fringe patterns with a plurality of photodetectors arranged such that each one of the plurality of photodetectors detects a corresponding fringe pattern; and demodulating signals output from the plurality of photodetectors.

18. The method of claim 14 wherein the step of monitoring the plurality of spatially separated interference fringe patterns includes the steps of:

modulating the phase of one of the optical sensor signals;

detecting the fringe patterns with a plurality of photodetectors arranged such that each one of the plurality of photodetectors detects a corresponding fringe pattern; and demodulating signals output from the plurality of photodetectors.

19. The method of claim 14 including the step of forming the interferometric sensors to comprise a plurality of fiber optic interferometers arranged in a parallel array.

20. The method of claim 19 including the step of forming each of the fiber optic sensors to guide a first polarization mode along a first optical path and a second polarization mode along a second optical path.

21. The method of claim 14 including the step of forming each of the fiber optic sensors to guide a first polarization mode along a first optical path and a second polarization mode along a second optical path.

22. The method of claim 21 including the step of forming each of the fiber optic sensors to guide a first polarization mode along a first optical path and a second polarization mode along a second optical path.

23. The method of claim 20 including the step of separating optical signals in the return optical fiber into a plurality of signal portions having both the first and second polarization modes therein.

24. A method for forming a sensing system, comprising the steps of:

arranging a plurality of interferometric sensors in an array to monitor a selected parameter;

providing two-mode optical signals to each of the plurality of interferometric sensors, each of the plurality of interferometric sensors being formed such that the two modes have different propagation velocities therein and such that each of the plurality of interferometric sensors produces an optical signal indicative of changes in the parameter;

forming the interferometric sensors to comprise a plurality of fiber optic interferometers arranged in a parallel array;

forming each of the fiber optic sensors to guide a first polarization mode along a first optical path and a second polarization mode along a second optical path;

receiving output signals output from each of the plurality of interferometric sensors on a single return optical fiber;

separating optical signals in the return optical fiber into a plurality of signal portions having both the first and second polarization modes therein;

separating optical signals in the return fiber into a first optical sensor signal output and a second optical sensor signal output;

combining the first optical sensor signal output and the second optical sensor signal output to produce a plurality of spatially separated interference fringe patterns, each interference fringe pattern corresponding to the optical signal output from a selected sensor by the steps of:

receiving the first and second optical sensor signal outputs with a Fourier transform lens; and arranging a grating in relation to the Fourier transform lens such that the fringe patterns form on the grating with the fringe patterns being spatially separated; and monitoring the plurality of spatially separated interference fringe patterns simultaneously and continuously to detect changes in the parameter.

25. A sensing system for monitoring a selected parameter, comprising:

a plurality of fiber optic interferometric sensors arranged in an array, the plurality of fiber optic interferometers being arranged in a series array, each fiber optic interferometer being formed to guide a first polarization mode along a first optical path and a second polarization mode along a second optical path;

means for introducing two-mode optical signals into each of the plurality of fiber optic interferometric sensors such that each of the plurality of fiber optic interferometric sensors produces an optical signal indicative of changes in the parameter;

a return optical fiber for receiving output signals from each of the plurality of interferometric sensors;

a mode filter connected to the return fiber for separating output signals in the return optical fiber a first signal of a first polarization and a second signal of a second polarization;

a Fourier transform lens arranged to receive the first and second signals output from the mode filter and combine them to produce a plurality of spatially separated fringe patterns;

a grating arranged in relation to the Fourier transform lens such that the fringe patterns form spatially separated on the grating; and means for monitoring the plurality of spatially separated interference fringe patterns simultaneously and continuously to detect changes in the parameter.

26. The fiber optic sensing system of claim 1 wherein the fiber optic sensor array includes a fiber optic sensor that comprises:

a first single mode optical fiber that guides an optical signal in the $LP_{01}$ mode;

a length of two-mode optical fiber having first and second ends, the first end being connected to an end of the single mode optical fiber, the ends of the single mode fiber and the two-mode optical fiber being arranged such that a first portion of the optical signal guided by the single mode optical fiber couples into the $LP_{01}$ mode in the two-mode optical fiber and a second portion of the optical signal guided by the single mode optical fiber couples into the $LP_{11}$ mode in the two-mode optical fiber; and a second single mode fiber having an end connected to the second end of the two-mode optical fiber such that portions of the both the optical signals in the $LP_{01}$ mode and the $LP_{11}$ mode in the two-mode optical fiber couple into the $LP_{01}$ mode in the second single mode fiber.

27. A method for forming a sensing system, comprising the steps of:

connecting a plurality of fiber optic interferometric sensors in an array;

introducing two-mode optical signals into each of the plurality of fiber optic interferometric sensors such that each of the plurality of fiber optic interferometric sensors produces an optical signal indicative of changes in the parameter;

arranging a Fourier transform lens to receive the optical signals indicative of changes in the parameter and to provide a lens output signal that includes a plurality of spatially separated interference fringe patterns, each interference fringe pattern corresponding to the optical signal output from a selected one of the plurality of interferometric sensors;

arranging a transmission grating to receive the plurality of spatially separated interference fringe patterns, the transmission grating having a groove spacing corresponding to the spatially separated interference fringe patterns such that the fringe patterns are transmitted through the grating; and monitoring the plurality of spatially separated interference fringe patterns simultaneously and continuously to detect changes in the parameter.

28. The method of claim 27 wherein the step of connecting a plurality of fiber optic interferometric sensors in an array includes the steps of:

providing a first single mode-optical fiber that guides an optical signal in the $LP_{01}$ mode;

connecting a first end of a length of two-mode optical fiber to an end of the single mode optical fiber, the ends of the single mode fiber and the two-mode optical fiber being arranged such that a first portion of the optical signal guided by the single mode optical fiber couples into the $LP_{01}$ mode in the two-mode optical fiber and a second portion of the optical signal guided by the single mode optical fiber couples into the $LP_{11}$ mode in the two-mode optical fiber; and connecting an end of a second single mode fiber to a second end of the two-mode optical fiber such that portions of the both the optical signals in the $LP_{01}$ mode and the $LP_{11}$ mode in the two-mode optical fiber couple into the $LP_{01}$ mode in the second single mode fiber.

\* \* \* \* \*